United States Patent [19]

Lawton

[11] 4,111,703

[45] Sep. 5, 1978

[54] HEAT-SENSITIVE COATING COMPOSITION WITH 4-AROMATIC AND HYDROXY SUBSTITUTED PIPERIDINE DERIVATIVE AND CYCLIC POLYKETO COMPOUND

[75] Inventor: William R. Lawton, Orchard Park, N.Y.

[73] Assignee: Graphic Controls Corporation, Buffalo, N.Y.

[21] Appl. No.: 774,210

[22] Filed: Mar. 3, 1977

Related U.S. Application Data

[63] Continuation-in-part of Ser. No. 772,084, Feb. 25, 1977.

[51] Int. Cl.$^2$ .............................................. C09D 11/00
[52] U.S. Cl. .................................... 106/21; 96/90 R; 428/913; 252/1; 106/22; 106/14.5
[58] Field of Search .................... 96/90 R; 428/913; 106/21, 22, 14.5; 8/2; 250/317; 252/1

[56] References Cited

U.S. PATENT DOCUMENTS

| 2,967,785 | 1/1961 | Allen et al. | 8/2 |
| 3,024,362 | 3/1962 | Sus et al. | 106/21 |
| 3,149,991 | 9/1964 | Baumann et al. | 428/913 |
| 3,664,858 | 5/1972 | Huffman | 428/913 |
| 3,736,166 | 5/1973 | Lawton | 428/913 |

*Primary Examiner*—Won H. Louie, Jr.
*Attorney, Agent, or Firm*—Kegan, Kegan & Berkman

[57] ABSTRACT

A heat-sensitive coating adapted to acquire a stable color contrasting with the background color in selected regions that are heated to an elevated temperature. The coating comprises (1) a piperidine derivative substituted in the 4 position with an aromatic group and a hydroxyl group or a hydrogen atom, (2) a cyclic polyketo compound reactive with the piperidine derivative to form a dye, and (3) a polymeric binder for binding the reactants to a substrate.

5 Claims, No Drawings

HEAT-SENSITIVE COATING COMPOSITION WITH 4-AROMATIC AND HYDROXY SUBSTITUTED PIPERIDINE DERIVATIVE AND CYCLIC POLYKETO COMPOUND

This application is a continuation-in-part of my copending United States Application entitled HEAT SENSITIVE RECORDING COMPOSITION WITH COMPLEXED PHENOLICS, Ser. No. 772,084 filed Feb. 25, 1977.

BACKGROUND OF THE INVENTION

This invention relates to recording members containing heat-reactive components and, more particularly, to recording members capable of us in thermographic copying, thermal printing, event recording, and as transparencies for overhead projection.

Heat sensitive sheets containing the cyclic polyketo compounds of this invention, useful for copying and recording and characterized by the ability to form a mark of contrasting color when heated to an activation temperature of 50° C. are known in the art. They are used in thermographic processes wherein a recording member is positioned on a graphic original and exposed to infrared radiation to cause selective heating of the dark areas of the original sufficient to form a copy thereof on the heat sensitive member. The thermally responsive members have also been used to record the heated portions of a thermal print-head and also to record a colored trace when contacted by the hot stylus of a thermal recorder. The ninhydrinamine reaction wherein ninhydrin reacts with amino acids, primary amines, and certain derivatives of morpholine, piperidine, and pyrrolidine to give the dye commonly referred to as Ruhrman's purple is well known. Isatin reacts with these same amines to give isatin blue. Alloxan reacts with the amines to give a red dye. These reactions have been used in numerous inventions for thermally responsive copy and recording papers and films. Lawton, U.S. Pat. No. 3,736,166 used ninhydrin with various morpholine and piperidine derivatives to prepare transparencies for overhead projection. Lawton, U.S. Pat. No. 3,293,061 combined ninhydrin or hydrindantin with isatin-amine condensates to provide thermographic copy sheets. Bauman and Lawton reacted ninhydrin or hydrindantin with complexes of amines and flavans or phenolic compounds to make thermographic copy sheets, see U.S. Pat. No. 3,149,991 and U.S. Pat. No. 3,149,992. Huffman, U.S. Pat. No. 3,664,858 combined ninhydrin with the adducts of morpholine or piperidine and organic acids in thermal recording members. Sus. U.S. Pat. No. 3,024,362 combined hydrindantin with amino acids or salts of primary amines with organic carboxylic and sulfonic acids to make a thermocopy paper. Allen, U.S. Pat. No. 2,967,785 used the adducts of morpholine or piperidine with isatin or ninhydrin as the color forming material in thermocopy papers. Small, U.S. Pat. No. 3,573,958 combined an amine with a halide or organometallic halide of germanium, silicon, lead, and tin with hydrindantin to provide a heat-sensitive recording sheet. In each case the normal dye formations of Ruhrman's purple with ninhydrin, red dye with alloxan, and isatin blue were obtained.

The above thermally reacting color forming systems containing ninhydrin, isatin, alloxan, and their derivatives have a number of limitations. The most accepted commercial products use ninhydrin or hydrindantin as the color former. The image is purple, and has a tendency to fade with exposure to light and with time. It is desirable to have more acceptable image colors such as blacks, dark browns, and the like and improved resistance to image fading by light exposure or aging.

I have found that thermal images with more desirable colors and greater stability to light and aging can be obtained by using as the heat reacting material a cyclic polyketo color precursor and piperidine derivatives substituted at the 4 position with an aromatic group and a hydroxyl group of hydrogen atom. The substitutents at the 4 position cause a color shift from the purple normally obtained when piperidine and other amines are reacted with ninhydrin or hydrindantin to give dark shades of brown, black, blue-black, blue, etc. Similar color shifts are found when isatin derivatives were used to replace the ninhydrin.

DETAILED DESCRIPTION OF THE INVENTION

Preparation of Transparencies

The cyclic polyketo compound and the 4-substituted piperidine derivative are dissolved in a solution of a polymeric binder in an organic solvent. The binder acts only as a vehicle which holds the color reactants on the substrate. Any transparent binder such as acrylic and methacrylic polymers or copolymers, vinyl ester polymers and copolymers, cellulose esters, nitrocellulose, styrene polymers and copolymers, polyvinyl butyral, etc., can be used. The solvents convenient for use with this system include ketones such as methylethylketone, alcohols such as methanol, esters such ethyl acetate, and aromatics such as toluene. It is normal to include stabilizers in the transparency formulations. Commonly used stabilizers are those described in U.S. Pat. No. 3,736,166 and include substituted ureas and thioureas such as ethylurea, n-propylurea, allylurea, N-methylthiourea, and allylthiourea; and gallic acid, o-, m-, and p-toluic acids, 2-mercaptobenzothiazole and 2,2'-dithiobis (benzothiazole). Activators can be used to increase the sensitivity or thermal response of the transparencies as well as the recording papers of this invention. Some of the useful activators include the following:

TABLE I — ACTIVATORS 2-mercaptobenzothiazole
2-mercaptobenzoxazole
2,2'-dithiobis (benzothiazole)
2-benzoxazolethiol
2-benzothiazolol
2-morpholinothiobenzothiazole
2,4-dichloro-1-naphthol
2-chloroacetamide
o-tuluic acid
m-toluic acid
p-toluic acid
thioacetanilide
thiobenzanilide
phenoxazine
phenyl-3-thiocarbazide
N-cyclohexyl-2-benzothiazolesulfenamide (Santocure powder)
2-(2,6-dimethyl-4-morpholinothio benzothiazole) (Santocure 26)
N-tert-butyl-2-benzothiazolesulfenamide (Santocure NS)

sulfanilamide
4,4-dithiodimorpholine (Sulfasan R)
1,1,3,3-tetramethyl-2-thiourea
2,4-thiazolidenedione
thiazolidenethione
N-methylbenzothiazole-2-thiourea
p-hydroxy-acetophenone
1,3-indanedione
butylziram
2,2-dithiobis (benzothiazole)
chloroacetophenone
3,5-dibromosalicylaldehyde
3,4-dihydroxybenzoic acid
biphenyl
acetoneoxime Suitable transparent films which may be used for the substrate for the transparencies include Mylar brand terephthalate polyester film manufactured by duPont, polycarbonates, polyamides, polystyrene, and cellulose acetatebutyrate copolymers.

The coatings may be applied by any of the normal coating procedures such as Meyer rod, reverse roll, kiss-coat, etc. The coating weights of the thermosensitive layers can be varied from 2 to over 10 lb/3000 sq ft.

Example A, which follows, shows typical combinations useful as transparencies for overhead projection. The ratios of amine to ninhydrin have been varied from 2/1 to 1/10. Acceptable thermal images have been obtained with all coatings. A typical transparency is prepared in the following manner.

RESIN SOLUTION

| Parts | |
|---|---|
| 134 | methanol |
| 386 | methylethylketone |
| 20 | nitrocellulose RS 5–6 sec. (Hercules) |
| 45 | Elvacite 2044 polybutylmethacrylate (duPont) |

"A" MIX

| Parts | |
|---|---|
| 75 | resin solution |
| 1.6 | piperidine derivative |
| .8 | acetoacet-o-toluidide stabilizer |
| 1.5 | p-toluic acid |

"B" MIX

| Parts | |
|---|---|
| 142 | resin solution |
| 4 | ninhydrin |

The formula consisting of 10 parts "A" with 14 parts "B" is coated on 3 mil Mylar with a No. 24 Meyer wire wound rod. After coating and drying, the resulting transparent sheet is imaged on a Thermofax machine in the normal manner to give high density imaged transparencies suitable for overhead projection. The coated sheets showed excellent stability at ambient conditions, in a 100 percent relative humidity chamber, and at 55° C. The color of images from typical 4-aromatic substituted piperidines in the above formula are as follows:

4-benzyl-4-hydroxypiperidine-dark green
4-hydroxy-4-phenylpiperidine-black
4-(p-chlorophenyl)-4-hydroxypiperidine-black In addition to the functionality of the 4-substituents as a determinant of image color, the color can also be controlled by the selection of a stabilizer. As examples of this, 4-hydroxy-4-phenylpiperidine with acetoacet-o-toluidide gives a black image, with ethyl urea a blue image, and with gallic acid a black image is obtained. Obviously, the use of stabilizer additives increases the range of imaging colors.

Other positions on the 4-substituted piperidine ring may be substituted so long as one of the positions adjacent to the nitrogen atom is unsubstituted. Example B: Preparation of coated papers for thermocopy, thermal printer, and thermal stylus chart recording applications.

Separate ball mill grinds were made of the piperidine compounds, the cyclic polyketo derivatives, and any additives used as accelerators or stabilizers. The following examples list the combinations, ratios, coating weights, and image colors obtained when imaged on a 3M Co. thermal copier sold under the trademark Thermofax Secretary, Texas Instrument Silent 700 matrix thermal printer, and a Sanborn Viso Cardiette thermal chart recorder. The coating mixes were prepared by ball-milling the components in a 5 percent aqueous polyvinyl alcohol solution at a 15 percent concentration of the dry components. The mixes were combined in the indicated ratios and coated with a No. 16 wire wound Meyer rod onto a 25 lb/3000 sq ft sulfite paper base stock.

TABLE II -- EXAMPLES

| 4-substitution | Precursor | Stabilizer | Ratio | Basic Weight lb/3000 sq ft | Trace color |
|---|---|---|---|---|---|
| 4-hydroxy-4-phenyl | ninhydrin | o-toluic acid | 2/4/.5 | 3.1 | brown |
| " | " | " | 4/4/.5 | 2.5 | dark brown |
| " | " | " | 4/2/.5 | 2.1 | black |
| " | hydrindantin | — | ½ | 1.5 | red-brown |
| " | " | o-toluic acid | 1/2/.5 | 3.8 | red-brown |
| " | ninhydrin | p-toluic acid | .25/4/2 | 2.4 | purple-black |
| " | " | " | .5/4/8 | 2.8 | purple-brown |
| " | " | " | .5/4/4 | 3.0 | purple-black |
| " | " | " | .5/4/2 | 1.6 | brown-black |
| " | " | " | 1/4/2 | 1.1 | dark brown |
| " | " | " | 2/4/2 | 2.3 | dark brown |
| " | " | " | 4/4/2 | 2.0 | yellow-brown |
| " | " | " | 1/8/1 | 2.2 | brown-black |
| " | " | " | 1/12/4 | 2.6 | dark brown |

TABLE II -- EXAMPLES-continued

| 4-substitution | Precursor | Stabilizer | Ratio | Basic Weight lb/3000 sq ft | Trace color |
|---|---|---|---|---|---|
| " | hydrindantin | 2-mercapto-benzothiazole | 1/1/5 | 2.4 | red-brown |
| " | " | 2,2'-dithiobis (benzothiazole) | 1/1/5 | 3.1 | red-brown |
| 4-phenyl | ninhydrin | p-toluic acid | 1/2/1 | 2.4 | black |
| " | " | ethylurea | 2/4/1 | 2.8 | black |
| " | hydrindantin | p-toluic acid | 1/2/1 | 2.4 | black |
| 4-hydroxy-4-p-chlorophenyl | ninhydrin | p-toluic acid | 1/2/1 | 1.2 | dark brown |
| " | hydrindantin | " | 1/2/1 | 1.4 | brown |
| 4-hydroxy-4-benzyl | " | " | 1/2/1 | 2.2 | olive green |
| 4-phenyl | isatin | — | ½ | 3.3 | green |
| " | alloxan | — | ½ | 3.5 | red |
| 4-hydroxy-4-phenyl | isatin | — | ½ | 4.0 | lavender-brown |
| " | alloxan | — | ½ | 3.7 | red |
| 4-p-chlorophenyl-4-hydroxy | isatin | — | ½ | 3.5 | lavender-brown |
| " | alloxan | — | ½ | 2.5 | red |

What is claimed is:

1. A heat-sensitive coating composition adapted to acquire in a region thereof a stable color constrasting visibly with a background color of said coating composition upon heating said region to an elevated temperature, containing
   polymeric binder means for binding said coating composition to a substrate,
   a 4-hydroxy substituted piperidine derivative selected from the group consisting of 4-benzyl-4-hydroxypiperidine, 4-hydroxy-4-phenylpiperidine and 4-(p-chlorophenyl)-4-hydroxypiperidine, and
   a cyclic polyketo compound reactive with said piperidine derivative at an elevated temperature to form a color contrasting visibly with a background color of said coating composition, said cyclic polyketo compound being selected from the group consisting of ninhydrin, hydrindantin, isatin and alloxan.

2. The coating composition of claim 1, containing a stabilizer adapted to enhance permanency of color formed in said preselected region after heating, said stabilizer being selected from the group consisting of substituted ureas and thioureas, gallic acid, o-toluic acid, m-toluic acid, p-toluic acid, 2-mercaptobenzothiazole, and 2,2'-dithiobis(benzothiazole).

3. The coating composition of claim 1, wherein said 4-hydroxy substituted piperidine derivative is 4-hydroxy-4-phenylpiperidine and said coating composition further contains a compound selected from the group consisting of acetoacet-o-toluidide, ethyl urea, and gallic acid.

4. The coating composition of claim 1, wherein said polymeric binder means is selected from the group consisting of acrylic polymers and copolymers, methacrylic polymers and copolymers, vinyl ester polymers and copolymers, and polyvinyl butyral.

5. The coating composition of claim 1, containing an activator adapted to enhance thermal sensitivity of said coating composition, said activator being selected from the group consisting of:

2-mercaptobenzothiazole
2-mercaptobenzoxazole
2,2'-dithiobis (benzothiazole)
2-benzoxazolethiol
2-benzothiazolol
2-morpholinothiobenzothiazole
2,4-dichloro-1-naphthol
2-chloroacetamide
o-toluic acid
m-toluic acid
p-toluic acid
thioacetanilide
thiobenzanilide
phenoxazine
phenyl-3-thiocarbazide
N-cyclohexyl-2-benzothiazolesulfenamide (Santocure powder)
2-(2,6-dimethyl-4-morpholinothio benzothiazole) (Santocure 26)
N-tert-butyl-2-benzothiazolesulfenamide (Santocure NS)
sulfanilamide
4,4-dithiodimorpholine (Sulfasan R)
1,1,3,3-tetramethyl-2-thiourea
2,4-thiazolidenedione
thiazolidenethione
N-methylbenzothiazole-2-thiourea
p-hydroxy-acetophenone
1,3-indanedione
butylziram
2,2-dithiobis (benzothiazole)
chloroacetophenone
3,5-dibromosalicylaldehyde
3,4-dihydroxybenzoic acid
biphenyl
acetoneoxime.

* * * * *